United States Patent [19]

Venables, III et al.

[11] Patent Number: 4,542,568

[45] Date of Patent: Sep. 24, 1985

[54] APPARATUS FOR FORMING SPINE FIN HEAT EXCHANGER TUBES

[75] Inventors: Herbert J. Venables, III; Herbert J. Venables, IV, both of Chagrin Valley, Ohio

[73] Assignee: Venables Enterprises, Cleveland, Ohio

[21] Appl. No.: 499,283

[22] Filed: May 31, 1983

Related U.S. Application Data

[60] Continuation-in-part of Ser. No. 251,951, Apr. 7, 1981, Pat. No. 4,381,592, which is a division of Ser. No. 16,799, Mar. 2, 1979, abandoned.

[51] Int. Cl.$^4$ .............................................. B23P 15/26
[52] U.S. Cl. .............................. 29/157.3 AH; 29/727; 474/144
[58] Field of Search ............... 29/157.3 AH, 727, 742; 165/184; 74/611, 665 C, 665 R

[56] References Cited

U.S. PATENT DOCUMENTS

| | | | |
|---|---|---|---|
| 1,151,721 | 8/1915 | Sahlin | 29/726 X |
| 2,777,109 | 1/1957 | Sangster | 74/665 C X |
| 3,005,253 | 10/1961 | Venables, III | 29/157.3 AH X |

Primary Examiner—Howard N. Goldberg
Assistant Examiner—John T. Burtch
Attorney, Agent, or Firm—Pearne, Gordon, Sessions, McCoy, Granger & Tilberry

[57] ABSTRACT

An apparatus for forming helically wrapped spine fin heat exchanger tubes is disclosed which includes a rotatable cutter head operable to cut a strip of thin metal to provide a base portion and a multiplicity of spines integrally joined at one end to the base portion. A tube feed is provided to axially feed smooth tubing past the cutter head. As the tube is fed past the cutter head the cutter head operates to helically wind the spine fin material on the tube. A first drive is provided to drive the tube feed and cutter head in time relation to ensure that the tube is fed through a predetermined minimum distance during each revolution of the cutter head. A second drive is provided to increase the distance through which the tube is fed during each revolution of the cutter head to increase the helix angle of the material being wound onto the tube and correspondingly reduce the spine fin density at selected locations along the tube. The cutter feeds a constant amount of spine fin material to the tube during each revolution thereof so the base portion of the spine fin material is stretched a greater amount of the zones of lower density.

5 Claims, 7 Drawing Figures

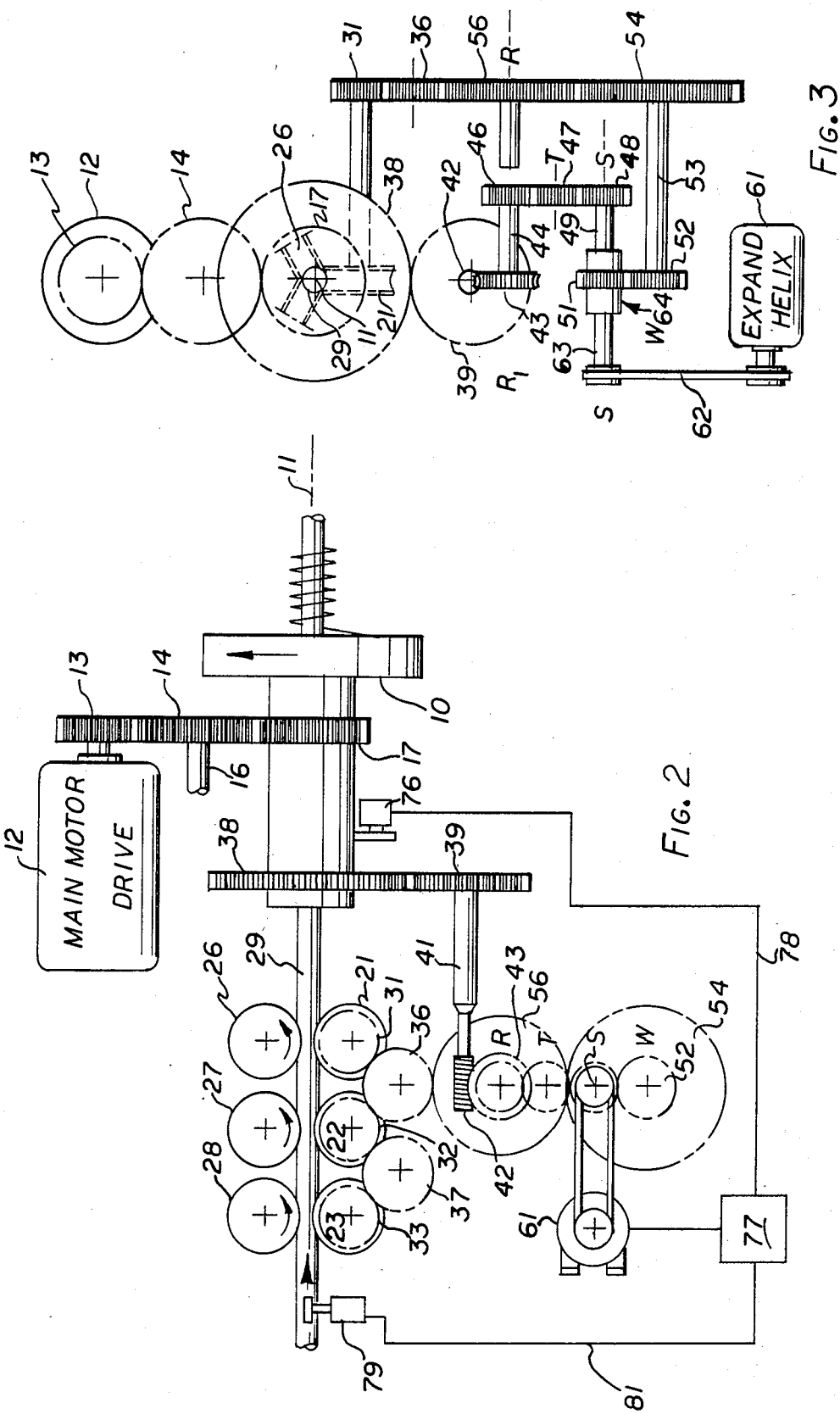

APPARATUS FOR FORMING SPINE FIN HEAT EXCHANGER TUBES

This application is a continuation-in-part of the copending application Ser. No. 251,951, now Pat. No. 4,381,592, filed Apr. 7, 1981 which in turn is a division of application Ser. No. 016,799 filed Mar. 2, 1979, now abandoned.

BACKGROUND OF INVENTION

This invention relates generally to the manufacture of spine fin heat exchanger tubes and more particularly to a novel and improved apparatus for manufacturing such tubing with variations in the spine fin density along the length of the tube.

PRIOR ART

It is known to provide an apparatus for producing heat exchanger tubes by winding spine fin material around a tube with uniform helix angle and as a consequence a uniform spine fin density. In such apparatus, it is customary to provide a cutter which cuts a strip or strips of thin metal to form spines along one or both edges thereof and leaving an uncut base portion integrally connected to one end of each spine. Such spine fin material is helically wound on a tube by feeding the strip or strips of spine fin material to a tube while producing a controlled relative axial movement and relative rotation between the cutter head and the tube. In most instances the tube is moved axially past the cutter without rotation and the cutter head rotates around the axis of the tube.

In such machines a single power source is mechanically connected to drive both the tube feeding subassembly and the rotating cutter head so as to maintain a constant relationship between the rate of feed and rate of rotation. As a consequence the spine fin material is wound with a constant helix angle and a constant spine fin density is provided along the length of a given tube. In such machines however, it is customary to provide a transmission which can be operated to change such ratio and the resulting helix angle and density but such transmissions can be shifted to change the ratio only while the machine is not operating. Once the transmission is shifted to provide a different ratio such ratio is maintained throughout the length of the tube being wound.

Examples of such machines for winding spine fin heat exchanger tubing are illustrated in the U.S. Pat. Nos. 3,005,253, 3,160,129, and 3,688,375. With such machines it is impossible to wind a tube wherein the spine fin density is varied along the length of the tube.

In addition the patent to Strikeleather U.S. Pat. No. 2,799,389 discloses a fin winding machine for producing heat exchanger tubes in which a solid fin is helically wound around the tube. Such machine provides a single power source to feed the tubing past a winding head and to rotate the tubing with respect to the winding head. Such machine also includes a variable speed drive which is asserted to permit the adjustment of the rate of rotation of the tube independent of its forward movement of the tube while the fin is being wound on the tube. In accordance with the disclosure of such patent however, there is no indication that this adjustment could be used to vary the fin density or vary the helix angle of winding in a given length of tubing. Instead, the adjustment is utilized to provide an operator with the ability to adjust the machine until a satisfactory product is being produced. This patent relates to an apparatus for winding a continuous fin and not to an apparatus for winding spine fin material.

SUMMARY OF THE INVENTION

In accordance with the present invention, an apparatus is provided which permits the manufacture of helically wound spine fin heat exchanger tubes in which the spine fin density along the length of the tube can be varied so as to produce a tube which provides optimum efficient use of the material forming the tube or so that the heat exchange capacity for unit length of tubing can be adjusted for optimum operation of the heat exchanger formed from such tube.

For example, in the manufacturer of spine fin heat exchanger tubes it is common to form bends in the tubes at selected locations along its length so as to provide multiple pass heat exchangers. Such bends are formed in the tube after the spine fin material is wound around the tube. It is therefore necessary to apply the force to the tube through the spine fin material to produce the bends. During the application of such force the spine fins at the bend are severely damaged and mutilated and after the bend is formed, such damaged spine fins cannot effectively contribute to the heat exchange capacity of the resulting heat exchanger. Therefore, it is desirable to wind the tubes so that a relatively low spine fin density is provided at the locations along the length of the tube where bends must be formed so as to minimize the amount of spine fin material which does not efficiently contribute to the heat exchange capacity of the resulting heat exchanger.

It is also desirable to minimize the spine fin density along the zones of the tube where bends are to be formed since the fins interfere with the proper application of bending forces to the tube and there is a tendency for the tubing to become buckled or flattened if the bending forces must be applied through too much spine fin material. On the other hand when the spine fin density is substantially lowered at the locations along the length of the tube where the bends are to be formed, it is possible to more accurately apply the forces for producing the bends to the tube in a manner which will minimize the tendency for tube buckling or collapse and there is less tendency for restrictions to be established at the bent portions of the tube. Therefore, not only is material saved by forming the tubes with a low spine fin density where bends are to be required but also a better product having less restrictions to flow through the tube is produced.

In addition, it is oftened desirable to vary the spine fin density along the length of the tube so as to match the heat exchange capacity of a given length of tubing to the conditions of the heat exchanger at such locations. For example, at locations where high flow of fluid over the heat exchanger is present, it is sometimes desirable to produce a tube with a relatively high density of spine fin material at such locations so as to match the heat exchanger capacity of the tube to the conditions present. In zones where low flow rates occur over the tube and as a result lesser heat exchange rates are possible, a lower spine fin density will sometimes suffice to provide efficient operation of the heat exchanger.

These and other advantages of producing variable densities spine fin heat exchanger tubing are more fully set forth in the related Pat. No. 4,381,592, and such patent is incorporated herein by reference in its entirety.

In the illustrated embodiment, an apparatus for producing spine fin heat exchanger tubes having variable density provides a cutter head assembly rotatable about an axis and a tube feed assembly operable to feed tubing along such axis through the cutter head. The cutter head operates to cut spines along at least one edge of a thin strip of material to form spine fin material which feeds to the tube and is helically wrapped around the tube as the tube is fed through the cutter head. A first drive is mechanically connected to both the cutter head and the tube feed assembly and operates to ensure that the tube is fed through a minimum predetermined distance during each revolution of the cutter head. This drive ensures that a minimum helix angle will be provided and a maximum density of spine fin material provided along the length of the tube.

An overriding clutch is provided in the first drive to ensure that the tube feed is maintained at least at such minimum value or ratio but which allows the tube feed apparatus to feed the tube a greater distance than such minimum distance during any given revolution of the cutter head.

A secondary drive is connected so as to operate the tube feed assembly at a greater speed or rate when desired. Hereagain, an overriding clutch is provided in the secondary drive which causes the secondary drive to actually produce feeding of the tube only when it is operated to increase the distance the tube is fed during a given revolution of the cutter head above the minimum predetermined distance provided by the first drive.

With this apparatus the primary drive ensures that a minimum feed ratio is maintained at all times even during start up and stopping of the machine and thus avoids overwrapping which can cause spine fin material breakage. However, when it is desired to reduce the density of the spine fin material along the length of the tube, the secondary drive is operated to increase the feed rate of the tube relative to cutter head rotation.

With a machine incorporating the present invention, it is possible with suitable controls to program the manufacture of heat exchanger tubing to provide varying spine fin density in substantially any desired pattern along the length of the tube. However, because the primary drive ensures that a predetermined minimum tube feed to cutter head rotation ratio is maintained, it is not necessary to provide absolute synchronization of two separate feed controls and problems of servo lag in the control circuits are avoided.

These and other aspects of this invention are illustrated in the accompanying drawings and are more fully described in the following specification.

BRIEF DESCRIPTION OF THE DRAWINGS

FIG. 2 and FIG. 3 are the side and end views schematically illustrating the gearing connecting the main drive and the secondary drive;

DETAILED DESCRIPTION OF THE DRAWINGS

The U.S. Pat. No. 3,688,375 illustrates the structural detail of a cutter head of the type to which this invention is particularly adapted and such patent is incorporated herein by reference to provide a detailed disclosure of such cutter head and its structure.

Figure 6:
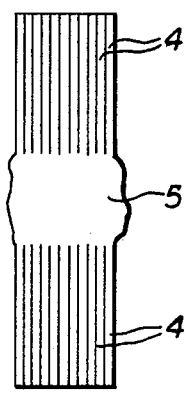
FIG. 6 is a fragmentary view illustrating a typical strip of spine fin material after it is cut and before it is shaped and wrapped.
Figure 7:
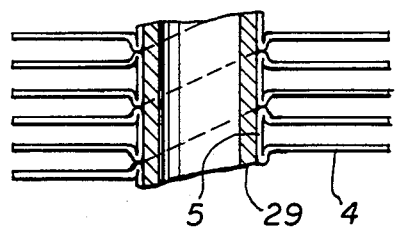
FIG. 7 is an enlarged fragmentary section of a wrapped tube.

The cutter head is provided with cutters which operate to cut a strip of thin metal (preferably aluminum) along its opposite edges as illustrated in FIG. 6 to form individual spines 4 which are integrally joined at their inner ends to an uncut base portion 5. After cutting the strip is shaped so that the spines 4 extend substantially normal to the base portion 5 as illustrated in FIG. 7. The cutter head also rotates around a smooth tube 29 which is axially fed through the cutter head in timed relation to its rotation with a result that the tube is helically wound with the uncut base 5 wrapped around the tube itself and the spines 4 extend generally radially from the tube to provide a large area of heat exchange spine material.

When the spine fin material is wrapped with a maximum density the base 5 of adjacent wraps actually contact as illustrated in FIG. 7. When lower density wrapping is desired the helix angle is increased and the bases of adjacent wraps are spaced from each other.

After the tube is wrapped to form the spine fin heat exchanger tube, it is shaped or bent as required to form a heat exchanger for use, for example, in an air conditioning unit. Such constant density tubing of the prior art has been used for many years in heat exchangers incorporated into air conditioners, both room units, and central station units manufactured by the General Electric Company of Schenectady, N.Y.

Figure 1:
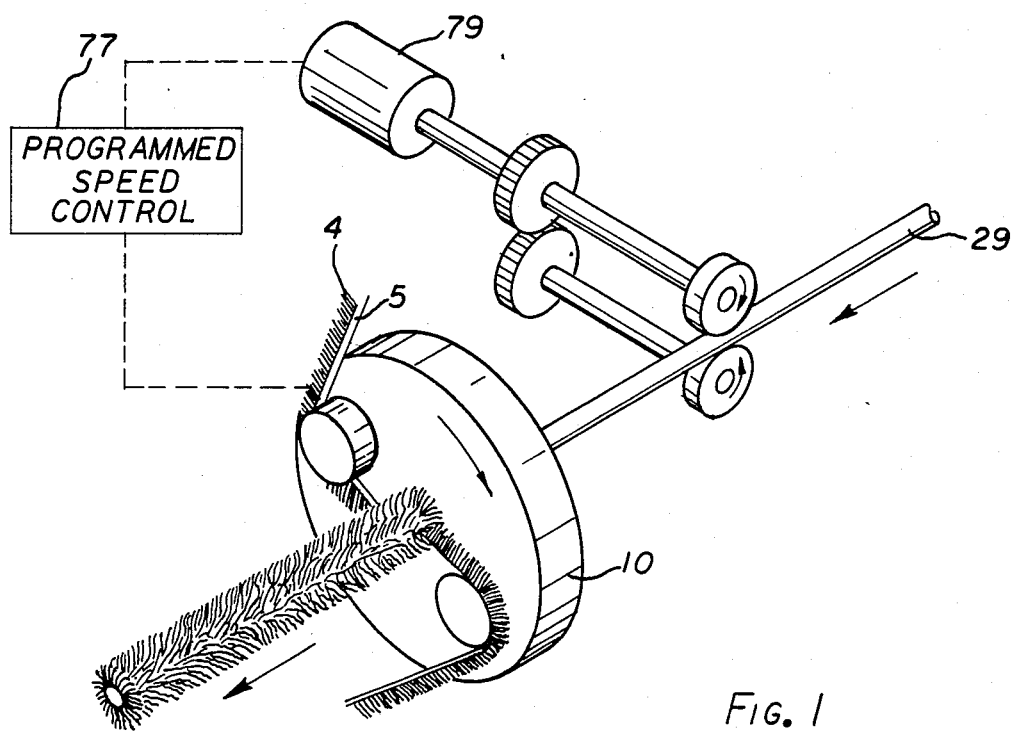
FIG. 1 is a schematic representation of an apparatus for producing helically wound spine fin heat exchanger tubing in acordance with this invention.

The apparatus in accordance with this invention is schematically illustrated in FIGS. 1 through 3. Referring to FIGS. 2 and 3, the apparatus includes a cutter head 10 which is rotatable around its axis 11 by a main drive motor 12. The drive connecting the main drive motor and the cutter head 10 includes a pinion gear 13, an idler gear 14 mounted on a shaft 16, and a driven gear 17 which is directly mounted on the cutter head 10. Therefore the cutter head 10 is rotated at a speed directly proportional to the speed of the main drive motor.

The apparatus also includes a set of drive rolls 21, 22 and 23 which cooperate with backup rolls 26, 27 and 28 respectively to move a smooth tube 29 axially through the cutter head for wrapping. In FIG. 2 for purposes of illustrated the backup rolls 26 through 28 are illustrated as diametrically opposite the drive rolls. However, in practice the backup rolls are preferably arranged as illustrated in FIG. 3 so that the tube 29 is engaged and supported in three peripherally spaced directions.

The drive rolls 21 through 23 are provided with associated gears 31, 32 and 33 respectively and such gears are interconnected by a pair of idler gears 36 and 37 as best illustrated in FIG. 2. Consequently the drive rolls 21, 22 and 23 all rotate in the same direction with the same velocity and the rate at which the tube 29 is moved axially through the cutter head is determined by the speed of rotation of such drive rolls.

There are two drive systems which operate to drive the rolls 21, 22 and 23. One drive system includes a drive gear 38 mounted on the cutter head 10 for rotation therewith and a driven gear 39 which meshes with the gear 38. The gear 39 is mounted on a support shaft 41 which also supports a worm gear 42 that meshes with and drives a worm wheel 43. Therefore the worm wheel 43 is rotated by a positive gear drive at a speed which is a direct function of the speed of rotation of the cutter head 10 and is a direct function of the speed of the main drive motor 12. Referring now to FIG. 3 the worm wheel 43 is connected to a shaft 44 to drive a pinion gear 46 and the pinion gear 46 through an idler gear 47 drives a driven gear 48 journaled for rotation on an axis S. The driven gear 48 is mounted on a stub shaft 49 and is operable through an overriding clutch (discussed in detail below) to drive a gear 51. Such gear 51 meshes with a driven gear 52 mounted on a shaft 53 to drive a gear 54. The gear 54 is in a gear train which includes the gear 31 of the roller 21, the idler gear 36 and an idler gear 56 journaled for rotation on an axis R. This gear system therefore connects the drive rolls 21 for rotation with a velocity which is a direct function of the rotation of the cutter head 10 when the overriding clutch discussed in detail below is engaged.

A second drive is provided to drive the feed rolls 21 with a velocity which is independent of the rate of rotation of the cutter head 10. This second drive includes a secondary drive motor 61 which is connected by a belt drive 62 to rotate a shaft 63 that is in turn connected to the gear 51 through an overriding clutch and is operable to increase the speed of rotation of the drive rolls 21 through 23 when it is desired to decrease the spine fin density.

Figure 4:
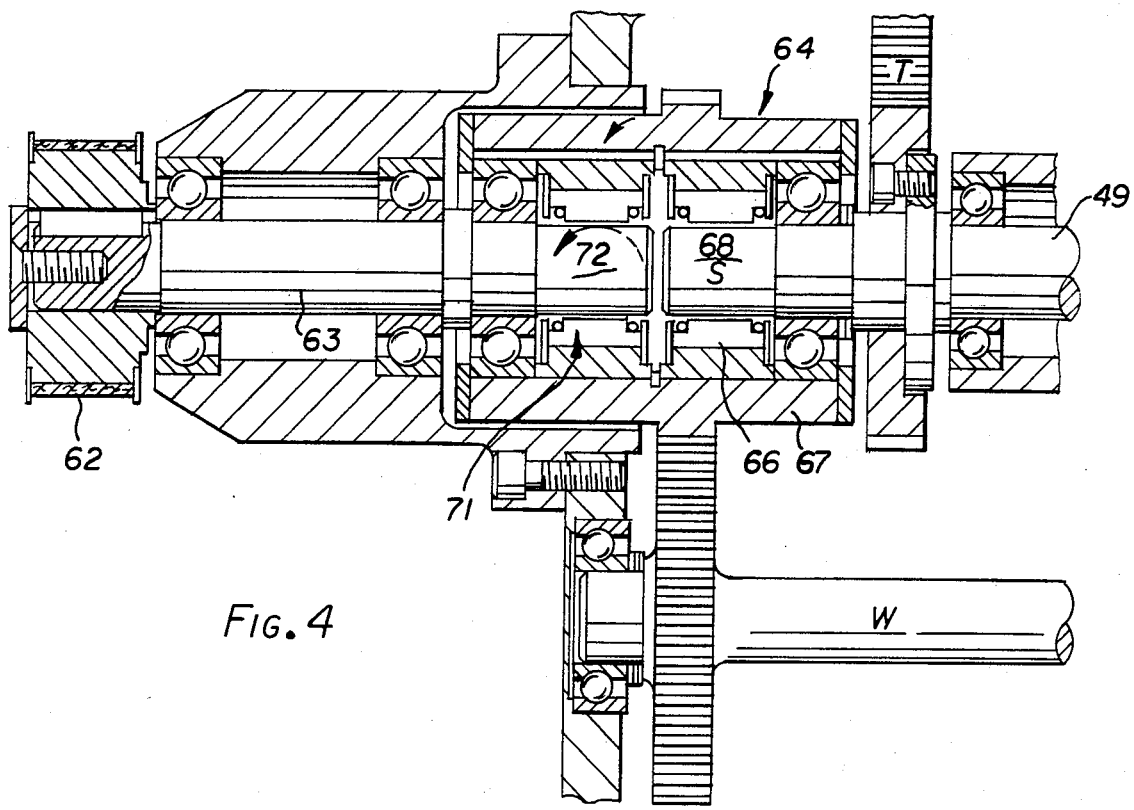
FIG. 4 is a side elevation and longitudinal cross section of the clutch mechanism for interconnecting the two drives.

The structural detail of the overriding clutches in the drive assembly 64 is illustrated in FIG. 4. This clutch assembly includes a first overriding clutch 66 mounted within a housing 67 for driving engagement with the inner end 68 of the shaft 49. Such overriding clutch may be of any suitable design so long as it automatically operates to engage and drivingly connect whenever the end of the shaft 68 attempts to rotate faster than the housing 67. Such clutch however automatically disengages whenever the housing 67 rotates faster than the shaft end 68.

A second overriding clutch 71 is provided to interconnect between the housing 67 and the end 72 of the drive shaft 63. Hereagain the overriding clutch 71 is of the type which automatically engages to provide a driving connection between the shaft end 72 and the housing 67 whenever the shaft 72 attempts to rotate with a rotational velocity greater than the rotational velocity of the housing 67 but automatically disengages to allow the housing 67 to rotate with a speed faster than the rotational velocity or speed of the shaft end 72. With this dual overriding clutch arrangement the housing 67 is rotated with either the shaft end 68 or the shaft end 72 which ever is rotating at a higher velocity.

Overriding clutches of the type illustrated are well known to those skilled in the art and can be acquired from the Morse Chain Company of Ithaca, N.Y.

In normal operation the machine is started initially by the main drive motor which rotates the cutter head 10 and through the gears 39, 42, 43, 46, 47, 48, 51, 52, 54, 56, 36 and 31 rotate the drive rolls which feed the tube 59 through a predetermined minimum distance during each revolution of the cutter head. When it is desired to increase the rate of feed of the tube 29 in order to expand the helix and reduce the density of the spine fins being wound around the tube, the motor 61 is operated to increase the speed of rotation of the drive rolls 21, 22 and 23 without a corresponding increase in the rotational velocity of the cutter head 10. When this is done the distance through which the tube 29 is moved axially during a given revolution of the cutter head is increased and the helix angle of the spine fin is wrapped on the tube is increased with a corresponding decrease in the density of the spine fins being wound around the tube 29. The cutter head 10 however still supplies the same amount of spine fin material to the tube during each revolution of the cutter head so the base portion of the spine fin material is merely stretched a small amount to accommodate the greater helix angle and it is not necessary to change the rate of feed of spine fin material to correspond to the greater feed rate of the tube 29.

With this apparatus it is therefore possible to vary the density of the spine fin material in substantially any desired way as the spine fin material is wrapped on the tube. FIG. 2 for example schematically illustrates a control system for controlling the operation of the motor 61. Such system includes a first sensor 76 suitably positioned to be driven by the cutter head and operable to produce either a velocity signal or an angular rotational signal which is supplied to a programmed speed control 77 through an electrical connection 78. A similar sensor 79 is positioned to be driven by the axially movement of the tube 29 and produces another signal which is either a velocity signal or a linear distance signal which is also supplied to the programmed speed control through an electrical connection 81.

Figure 5:
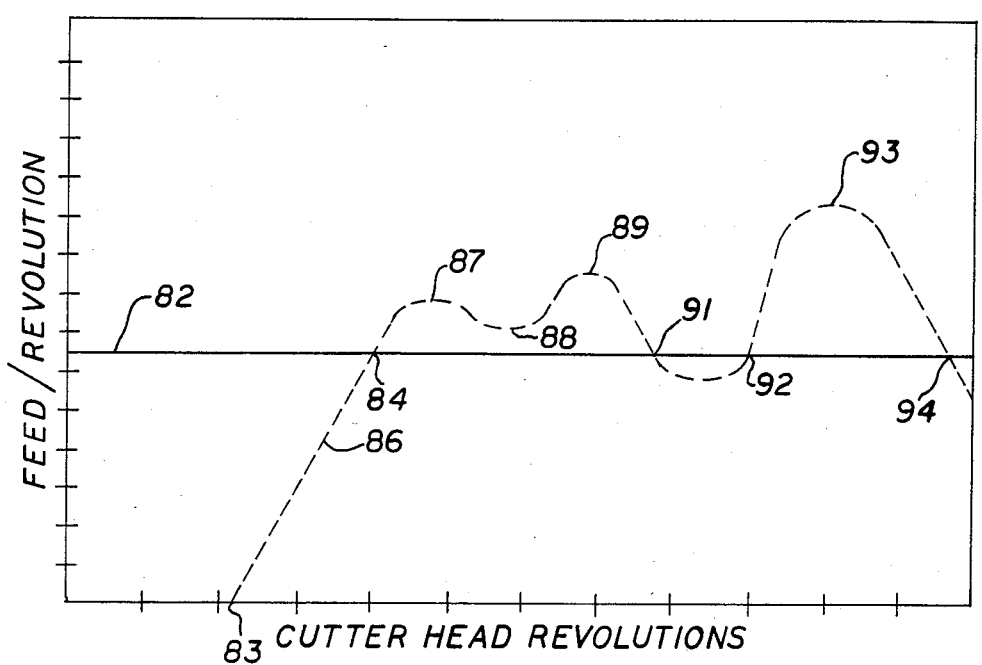
FIG. 5 is a graph illustrating how the feed may be varied to vary the spine fin density.

Such speed control 77 can for example be programmed to produce a spine fin tube having density variations as indicated in FIG. 5 where the feed per revolution is plotted on a vertical axis against cutter head revolutions. When the machine is started the control is programmed so that the auxilary motor 61 is not operated. During such conditions, the drive for the entire machine is provided by the main motor drive 10. Consequently the feed of the tube per revolution of the cutter is determined by the gear drive from the main motor 12 and a predetermined minimum rate of feed is established as represented by the line 82.

This determines the minimum helix angle and the maximum density possible with the apparatus. Such minimum feed is preferably established to produce a winding as illustrated in FIG. 7 with the adjacent bases 5 abutting. Because of the positive gear connection the relationship of such predetermined minimum rate of feed with respect to cutter head rotation is maintained from the instant the apparatus is started and is maintained as the apparatus is accelerated to operating speed. Therefore there is no lag which is normally present in servo systems, commonly referred to as servo lag.

After the apparatus has been operating through a predetermined number of revolutions indicated by the point 83, the motor 61 is energized and comes up to speed. As soon as the rate of rotation of the motor 61 reaches a speed in which the shaft end 72 is rotating at the same speed as the shaft end 68, a condition is reached at 84 where the dotted line 86 representing the speed of the drive motor 61 intersects the drive line 82. As the motor 61 continues to accelerate the overriding clutch 71 engages causing the clutch 66 to disengage and the feed roll speed is controlled by the speed of the motor 61. The distance the tube 29 is fed during each revolution of the cutter head is then determined solely by the speed of rotation of the motor 61 so that the feed relationship follows the dotted line curve up beyond the point 84 and leaves the line 82. The density is decreased to the point 87 as the motor 61 continues to accelerate and if for example the motor is slowed some small amount the density will again increase along the dotted line at 88. During these changes in feed, the rate of rotation of the cutter head 10 remains constant determined by the main motor drive 12.

If for example, the speed of the motor 61 is thereafter increased the feed correspondingly increases to the point 89. If the motor 61 is then slowed a sufficient amount so that the dotted line again crosses the line 82 at 91, the clutch 66 automatically engages and the clutch 71 disengages so the rate of feed automatically follows the line 82 from the point 91 to the point 92 even though the motor 61 continues to rotate at some positive speed below the speed required for it to take over the drive of the feed rolls.

If for example the motor 61 is again accelerated the feed per revolution will increase to another high point 93 and then as the motor 61 is slowed again the drive will be taken over by the main drive at the point 94 where the dotted line again crosses the solid line 82. In this example of the operation of the apparatus illustrated in FIG. 5, it is apparent that the main motor drive 12 controls the rate of feed of the tube at all times when the speed of the motor 61 is below the predetermined speed represented by the portion of the graph below the line 82. However at any point where it is desired to reduce the spine fin density the programmed controller 77 is arranged to speed the motor 61 to the speed required to change the feed of the tube so as to reduce the spine fin density to any desired value. Therefore, with an apparatus in accordance with the present invention it is possible to produce spine fin heat exchanger tubing having substantially any type of density variations which are desired.

The cutter head feeds the same amount of spine fin material during each revolution. Therefore during the reduced density wrapping the base 5 is stretched a greater amount than during high density wrapping. It has beeh found for example if a tube is wound with a density of about 20 turns or wraps per inch it is possible to increase the feed of the tube a sufficient amount to reduce the density to about 10 wraps per inch without encountering breakage problems.

Because a positive mechanical drive is provided to insure that a predetermined minimum tube feed is provided for each revolution of the cutter head even during periods in which the machine is started servo lag problems of speed control devices are not encountered and overwrapping or double wrapping does not occur. It should be understood that if overwrapping or double wrapping were permitted to occur during the start up of the machine the likelihood of breakage of the fin material would be very high.

The particular gearing system illustrated is representative of one gearing system which can be used and the particular arrangement illustrated is selected because it permits the retrofitting of existing winding machines with the variable speed drive of the present invention. It should also be noted that in many existing machines transmissions are provided which permit the changing of the basic ratio of tube feed to wrapping speed to permit changing of the number of wraps per unit lengths. However such transmission only permits the selection of three ratios. Further, such transmissions can only be shifted while the machine is stopped and once the machine is started the entire tube is wound with a uniform number of wraps per unit length. On the other hand with the present invention an almost unlimited number of ratios can be obtained without encountering any significant difficulty so long as the range of speeds is not sufficiently excessive to cause breakage of the spine fin material being wound onto the tube. Further the density can be changed along the length of a given tube.

Although the preferred embodiment of this invention has been shown and described, it should be understood that various modifications and rearrangements of the parts may be resorted to without departing from the scope of the invention as disclosed and claimed herein.

What is claimed is:

1. An apparatus for producing spine fin heat exchanger tubes in which the tube is helically wound with a strip of thin metal material providing an uninterrupted base wound directly on the tube and providing a multiplicity of individual spines integrally joined at one end to said base and extending substantially radially therefrom comprising a cutter head operable to cut a strip of material along at least one edge to produce a strip of spine fin material providing said base and said spines, a tube feed operable to feed a tube axially relative to said head, and drive means connected to said cutter head and said tube feed operable to produce timed relative rotation and relative axial movement between a tube being fed by said tube feed and said cutter head, said cutter head being operable to helically wrap said spine fin material around said tube with said base engaging said tube and said spine extending substantially radially with respect to said tube, said drive means including minimum ratio means insuring that said tube and cutter head move relative to each other through a minimum predetermined distance during each relative rotation therebetween to thereby wind said strip with a minimum helix angle, said drive means also being operable at selected intervals to increase the distance said tube and cutter head move relative to each other during each relative rotation to increase the helix angle of winding above said minimum helix angle at selected locations along the length of said tube, said drive means including a gear train mechanically interconnecting said cutter head and said tube feed to positively insure that said tube and cutter head move relative to each other at least through said predetermined minimum distance during each relative rotation, said drive means including a first motor drive mechanically interconnected to said cutter head and said tube feed operable to produce feeding at said predetermined minimum distance and a separate variable speed motor drive connected to said tube feed operable to control the feeding of said tube relative to said cutter head at said selected intervals, automatic clutch means being provided in the connection between said first motor drive and said tube feed which automatically release said tube feed from said first motor drive at said selected intervals.

2. An apparatus as set forth in claim 1 wherein a second automatic clutch operates to release the drive of said tube feed by said separate drive motor when the said first motor drive is controlling the rate of feeding of said tube.

3. An apparatus as set forth in claim 2 wherein signal generating means are provided to produce signals which are a function of the rotation of said cutter head and of the operation of said tube feed, and a controller is provided to control the operation of said second motor drive in response to said signals.

4. An apparatus as set forth in claim 1 wherein said cutter head operates to supply a constant amount of said strip of spine fin material to said tube during each relative rotation between said tube and said cutter head so that said base is stretched at said selected locations a greater amount than at locations other than said selected locations.

5. An apparatus as set forth in claim 2, wherein said automatic clutches are overriding clutches.

* * * * *